United States Patent

[11] 3,610,394

[72] Inventor William P. Sager
 Milwaukee, Wis.
[21] Appl. No. 44,775
[22] Filed June 9, 1970
[45] Patented Oct. 5, 1971
[73] Assignee A-T-O Inc.
 Cleveland, Ohio

[54] CONTAINER TRANSFER MEANS FOR SLOTTED BEAM TYPE CONVEYORS
 7 Claims, 6 Drawing Figs.
[52] U.S. Cl. .................................................. 198/28,
  198/102
[51] Int. Cl. ..................................................... B65g 47/66
[50] Field of Search .......................................... 198/28,
  102, 185

[56] References Cited
 UNITED STATES PATENTS
 2,237,345 4/1941 Frentzel ........................ 198/28

Primary Examiner—Edward A. Sroka
Attorney—John K. Crump

ABSTRACT: An assembly of elongated, parallel extending rods or fingers for receiving upright bottles and like containers from a conveyor means of the type employed in spray-type pasteurizers for bottled beer, for example, and formed of a continuous succession of tandemly arranged, transversely slotted carrier beams, wherein alternate of the fingers in the assembly are of a first length and extend over and angularly downwardly to the conveyor in positions to engage within the slots of the carrier beams as the latter complete an operating pass in the pasteurizer thereby to engage under and effect an initial stripping from the beam of such bottles as are supported thereon, and wherein the other of the fingers of the assembly are of a second, shorter length and extend in planar relation to the first-mentioned fingers over and angularly downwardly toward the conveyor in positions to engage just above the beams whereby to provide added support to the bottles as the latter are stripped from the beams by the first-mentioned fingers.

Inventor
William P. Sager
By John K. Crump
Attorney

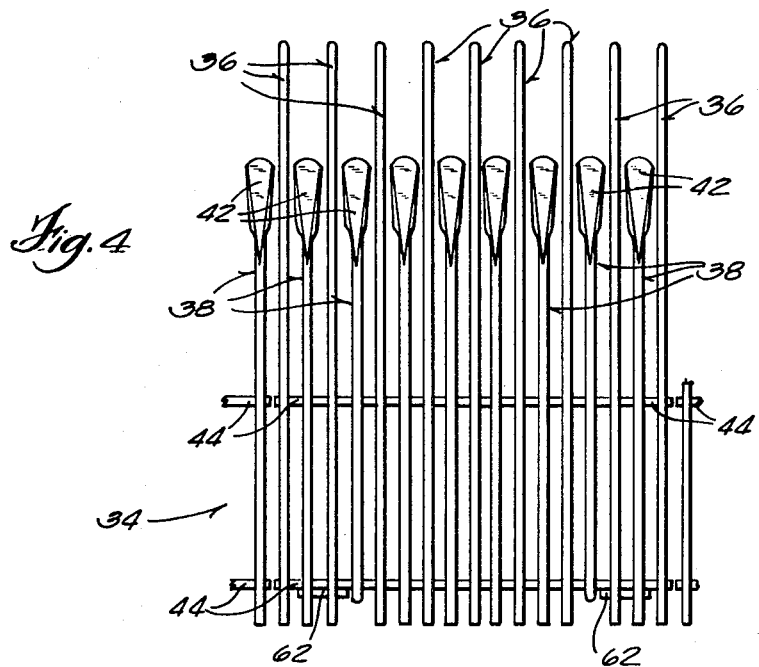
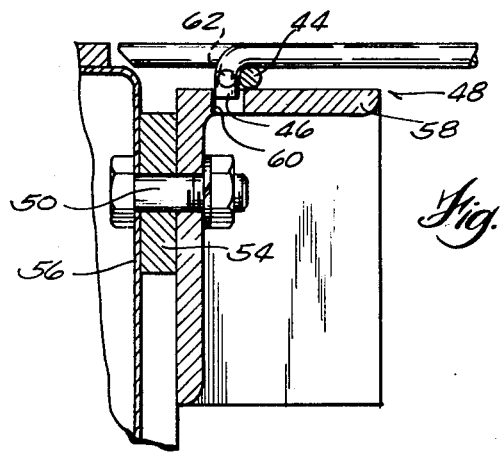
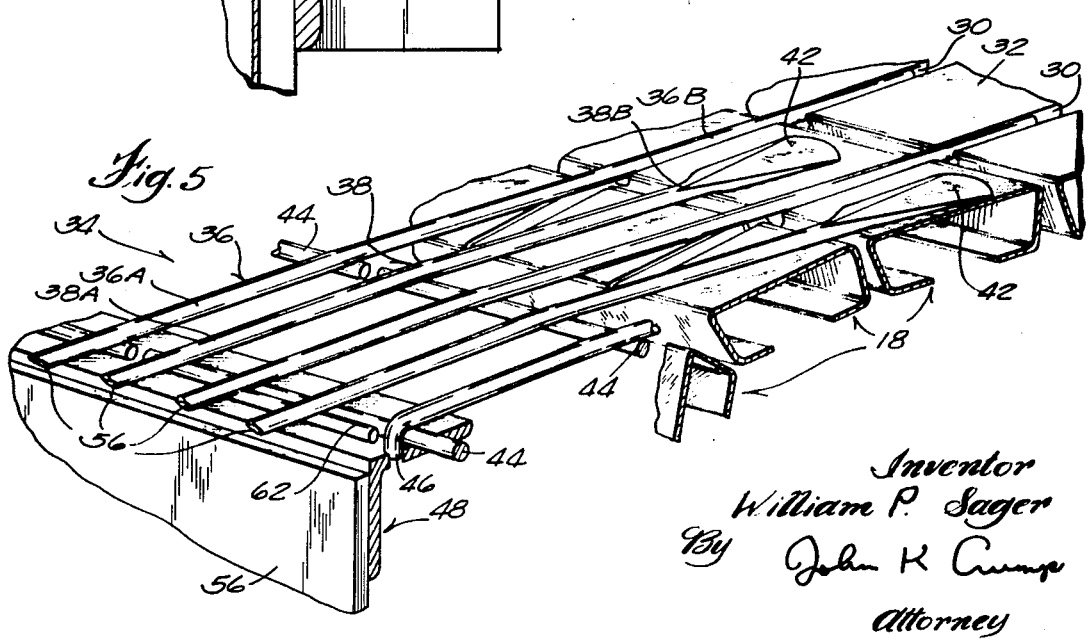

CONTAINER TRANSFER MEANS FOR SLOTTED BEAM TYPE CONVEYORS

This invention relates generally to the guiding or transferring of containers relatively off from a conveyor being employed to move containers in upright, free-standing positions through a processing machine and more expressly is directed to the removal of containers from a conveyor which is formed of an endless succession of tandemly arranged, transversely slotted carrier beams such as is shown, for example, in U.S. Pat. No. 2,778,478, entitled "CONVEYOR FOR SPRAY-TYPE PASTEURIZER," issued Jan. 22, 1957 to G. L. N. Meyer.

Heretofore, it has been conventional in the processing of bottle and like containers in a spray-type pasteurizer or other like processing machine employing a slotted carrier beam type of conveyor as the bottle transport means to mount a substantially full or continuous plate member horizontally along the downstream end of the conveyor to receive the bottles from the carrier beams of the conveyor upon the completing an operating pass in the machine. The plate generally extended inwardly adjacent to and normally partly over the end of the conveyor and the carrier beams in completing an operating pass in the machine moved directly under the plate with such bottles or other containers as were supported on the beams passing directly off the beams and onto the plate under the impetus provided the bottles by the beams. The bottles or other containers after acceptance on the plate moved across the plate and relatively toward a takeoff or discharge conveyor arranged along the outboard edge of the plate by the back force or pressure exerted by additional of the bottles or other containers transferring onto the plate from succeeding of the beams moving into the end of the machine and passing under the plate.

While this arrangement for the most part resulted in a relatively positive transference of the containers from the carrier beams in the discharge end of the pasteurizer, the use of such a plate was not completely without problems or drawbacks. More particularly, with such a plate, some vertical clearance necessarily had to be maintained between the plate and the end of the conveyor to enable the carrier beams to move through the end of the machine without hindrance or obstruction from the plate and this coupled with the intrinsic nature of the plate resulted in the presence at the interface between the plate and the conveyor of a certain minimum abutment edge or vertical discontinuity which the bottles had to traverse in moving from the beams onto the plate. The bottles thus tended to incur a certain amount of bumping and jostling in traversing the edge of the plate and this was not only physically detrimental to the bottles but also resulted in or led to bottle instability in and along the plate and, in the case of a particularly severe edge or discontinuity, to an occasional tipping or falling of the bottles on or in front of the plate. It was necessary therefore to pay constant attention to the discharge end of the machine to insure a proper flow of bottles therefrom and to prevent large scale blockages from developing in the machine and causing damage to the carrier beams of the conveyor and/or to the plate and other parts of the conveyor.

Of more significance was the fact that the presence of such an edge or vertical discontinuity on the plate and between the latter and the carrier beams dictated the need for a relatively high force or back pressure to be developed on the bottles to force the same onto the plate and an attendant need for a substantial number of bottles to be at all times present in and along the plate to assure a feed of bottles onto and over the plate. Because of this, large numbers of bottles invariably remained in the pasteurizer or other processing machine upon cessation of operation and inasmuch as in such a machine such residual or remaining bottles normally are required to be cleared manually therefrom prior to resuming operation considerable operator time normally had to be expended upon cessation of machine operation to prepare the machine for subsequent use. Normally, also, for complete clear-out to be effected it was necessary that the operator enter the machine even though the normal machine configuration presented only a limited space for accommodating an operator. This together with the high temperature and humidity conditions normally prevailing in the pasteurizer resulted in extreme discomfiture to the operator in effecting clear-out of the machine.

Various efforts have been directed towards reducing the severity of this abutment edge or shoulder in the receiver plate while still maintaining necessary clearances between the plate and the carrier beams. Thus, for example, it has been proposed to feather the inboard edge of the plate or to serrate the edge of the plate so as to provide alternate projections or tabs therein for reception in the slotted portions of the carrier beams. The measures proved only partially effective in overcoming the problems alluded to hereinabove. Moreover, these proposals involved extensive machining procedures in the fabrication of the plate and gave rise to substantially increased manufacturing costs, making these alternatives difficult to justify in view of the operational problems which generally still remained.

The present invention is directed to an improved type of receiver means for use with conveyors of the type described and which overcomes the drawbacks and limitations of prior designs of such receiving means through a series of novel rodlike elements configured and positioned to merge with the conveyor along the end thereof in a manner which avoids the forming along its interface with the conveyor of vertical discontinuities, abutment edges or the like requiring traversing by the containers in moving off the conveyor.

In accordance with a presently preferred embodiment of the invention, a series of generally similarly constructed rodlike members of an elongated, relatively small diameter construction are located in side-by-side relation to one another along and generally above the downstream end of the conveyor in spanning or bridging relation between the latter and a discharge conveyor for the containers. Certain ones of the rodlike members and more particularly, in the instance of a carrier beam which is constructed in the normal fashion with a uniformly spaced series of slots, alternate ones of the members are of a first length and include a horizontal outer end portion lying in planar relation with the discharge conveyor and an angularly downwardly formed, inner end portion projecting inwardly over the end of the conveyor and terminating in the plane of the conveyor in positions of registry with corresponding of the slots of the carrier beams along the end of the conveyor. These members as thus disposed initially engage within the slots of the successive carrier beams proceeding into the end of the pasteurizer or other processing machine with which the conveyor is employed to precipitate an initial lifting and transference to the fingers of such bottles as may be supported on the beams as the latter progress through the end of the machine in an operating pass.

The remaining ones of the rodlike members are of a somewhat reduced length and have substantially the same configuration or contour as the first described members, being formed with an outer end portion lying horizontal to the discharge conveyor and in coincident relation with the outer end portions of the earlier described members and an angularly downwardly formed, inner end portion projecting inwardly over the end of the conveyor in a coincident plane with the corresponding portions of the earlier members. In this instance, however, the fingers terminate just above the plane of the conveyor at a position which is behind or in downstream relation to the inner terminals of the first-described members and preferably are flattened or laterally enlarged along the terminal portions thereof. Thus positioned, these members serve to engage under the containers as the latter initially lift from the carrier beams under the action of the first-described fingers and provide necessary stabilization of the containers as the latter complete movement from the carrier beams. In the normal carrier beam construction the slot arrangement is such that a container will traverse at least one and more usually at least two adjacent slots of the carrier beams and thus a container in moving onto the fingers from the carrier beams will ride onto at least one and perhaps two of the longer of the rodlike members and at least two of the shorter of the members whereby to be assured of a firm, stabilized support in transferring onto the members.

For optimum smoothness in container movement onto the members from the carrier beams, the longer of the members are constructed such that the extreme inner tip portions thereof in engaging within the carrier beam slots lie coincident with or a slight distance under the effective container support surface of the beams while the shorter of the fingers are constructed and arranged so that the inner tips thereof are below or preferably in a coincident plane with the corresponding, immediately laterally adjacent segments of the longer of the fingers. In this way, the inner edges of the members are removed from the path of the containers as the latter move from the carrier beams onto and then over the length of the members to the discharge conveyor. An extremely smooth passage of containers relatively between the carrier beams and the discharge conveyor is thus effected and through the means of the present invention a substantially decreased back pressure is required to force containers relatively off the beams. This results in an appreciable reduction in the number of containers tending to remain on the conveyor and within the processing machine with which the conveyor is associated in stopping operation between runs of different containers or in changing over from one production lot of containers to another.

A further aspect of the invention concerns the provision for the fingerlike members of special releasable mountings designed to permit the latter to pop-free or dislodge from a normal operative position in the pasteurizer in the event of any interference between the fingers and the beams so that the beams may continue in movement incurring damage. For this purpose, laterally adjacent groups of the fingers are connected together as by pairs of transversely extending tie rods disposed along the underside of the fingers with one such rod in each pair thereof located along the outer end of the fingers and adapted to engage along a finger support bracket extending the width of the pasteurizer. One of the fingers along either side of each of the finger groupings is formed along its outer end and immediately adjacent the outer one of the tie rods with a downwardly turned hooklike portion or prong, the tip of which extends to within a vertical bore provided in the support bracket to thereby locate the fingers longitudinally of the conveyor. The fingers are otherwise free of support or constraint in the pasteurizer and under longitudinal loading of the inner end of any one or more of the fingers in any finger grouping as from a carrier beam accidentally engaging such finger or fingers, the prongs or hooklike portions of the side positioned fingers will tend to be rotated out of the bored portions of the bracket by the action of the outer tie rod against the bracket, thereby freeing the particular finger grouping containing the offending finger or fingers for movement from an interfering position with the carrier beams. The other of the fingers in each grouping are beveled along their outboard end portions and relatively inwardly in a direction from the top to the bottom surface of the fingers so as to provide necessary clearance between the ends of the fingers and the discharge conveyor to accommodate movement of the finger groupings from their associative mounting brackets in the event of carrier to finger interference.

Other objects and advantages of the present invention will become apparent in the course of the following description of a presently preferred embodiment of the invention when taken in conjunction with the accompanying drawings illustrating such embodiment.

IN THE DRAWINGS

FIG. 4 is a plan view of a portion of the container transfer means showing the general arrangement therein of the container receiver fingers;

FIG. 5 is a perspective view, on an enlarged scale, of the conveyor and the transfer means, further illustrating the arrangement of the transfer means to the carrier beams of the conveyor; and FIG. 6 is a fragmentary sectional view taken through the support bracket of the container transfer means showing the manner in which it is supported in the pasteurizer.

Figure 1:
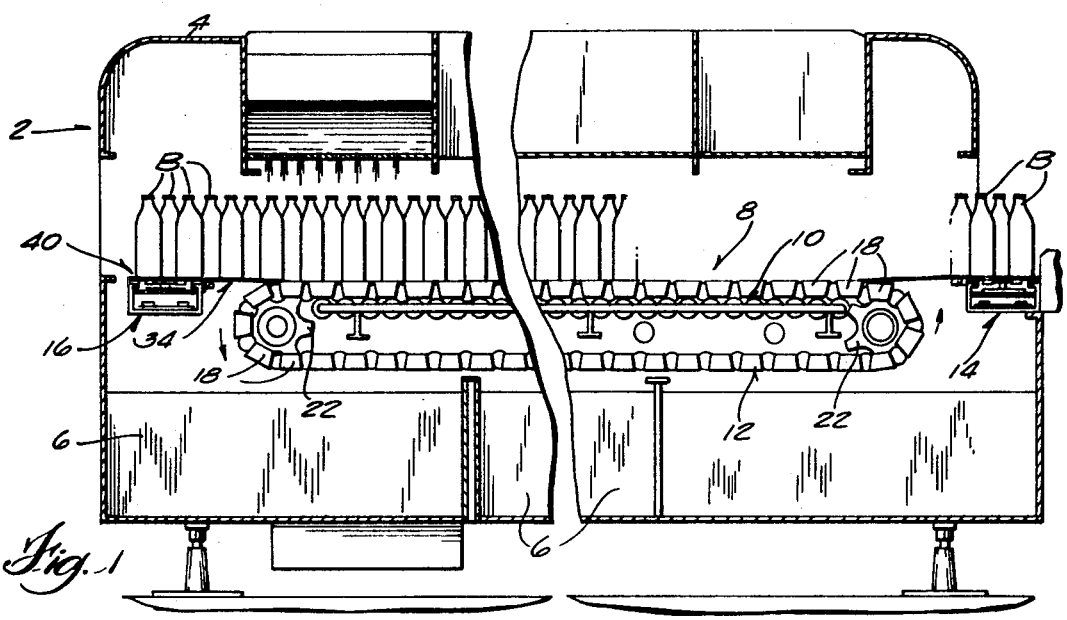
FIG. 1 is an overall view of a spray-type pasteurizer incorporating the improved container transfer means of the invention.
Figure 2:
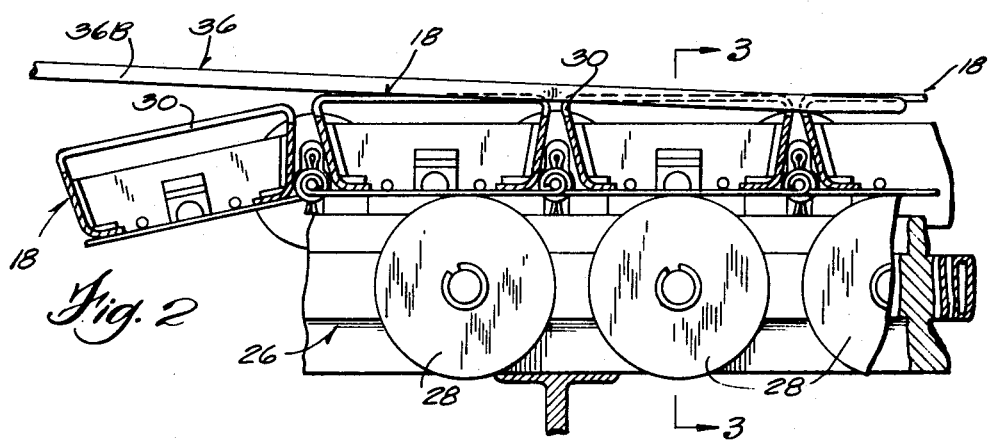
FIG. 2 is a fragmentary view, on an enlarged scale, of a portion of the slotted carrier beam conveyor, showing the arrangement thereto of the container transfer means of the invention.
Figure 3:
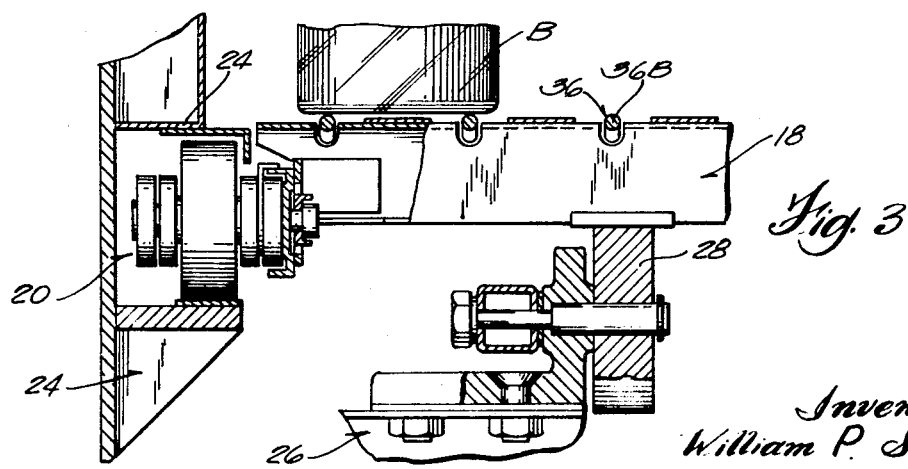
FIG. 3 is a transverse section of a fragmentary portion of the conveyor and container transfer means, taken on the lines 3—3 of FIG. 2.

Referring now to the drawings, the improved container transfer means of the invention is shown to be incorporated within a container processing machine 2 such as the type used in carrying out the pasteurization of beer after filling within containers and/or the warming of containers after filling with beer or a soft drink, for example, for the purpose of reducing "sweating" of the containers in later processing operations or during storage. Machines of this type are well known in the art, reference being made, for example, to U.S. Pat. No. 2,885,464, issued July 14, 1958 to G. L. N. Meyer and, for purposes of brevity, the machine is shown and described only generally herein except as to those features thereof which are directly concerned with the improvements of the invention.

The machine is for the most part of a conventional construction, comprising in a sheet metal housing or casing 4 formed internally with a succession of spray-type heating zones or compartments such as indicated at 6 a longitudinally extending main conveyor assembly 8 for moving containers such as bottles B through the compartments for heating therein. In the illustrated construction, the bottles are shown to have a right-to-left movement in the housing and the upper, operating run of the conveyor assembly in housing 4 and which is denoted by the reference numeral 10 in the drawings will be understood as having a right to left travel in the housing while the lower or return run of the conveyor, indicated at 12, has an opposite or left to right direction of movement. The bottles are adapted to be initially delivered to the housing for movement therethrough on conveyor assembly 8 by an infeed conveyor 14 mounted transversely in the right hand end of the housing and after completing movement through the compartments 6 are passed from the housing for further processing by a discharge conveyor 16 mounted in a similar fashion in the left hand end of housing 4.

Conveyor assembly 8 is of the type shown and described in detail in the aforementioned patent to Meyer being formed generally of a plurality of elongated carrier beams 18 arranged transversely between a pair of articulated carrier chains 20 and in tandem relation to one another successively along the full length of the chains whereby to define a continuous or endless support and conveyance structure in the housing for the bottles. Chains 20 are of a conventional roller linkage construction and are supported longitudinally in housing 4 along the opposed sides thereof by sets of laterally spaced sprockets 22 located in the opposed ends of the housing. For added support of chains 20, a pair of angle plates 24 is mounted lengthwise along each side of the housing with the plates of each such pair spaced vertically from one another to receive and track the chains 20 in the upper run 10 of the conveyor. The carrier beams 18 are preferably also supported intermediate of their ends to control deflection under load. This support is derived from a beam 26 mounted longitudinally of housing 4 in a generally centrally position therein directly under the conveyor pass 10 with the beam provided with a series of aligned, rotatable wheels 28 to effect antifriction engagement with the beams.

While not shown, it will be understood that the drive motor or other power source of the machine is connected to one or both of the sprocket sets 22 to drive conveyor assembly 8 for continuous movement in the housing and thereby provide an uninterrupted movement of bottles therethrough.

Generally, in a machine of the present type and as is exemplified in the aforesaid patent to Meyer, it is conventional to provide the carrier beams of the conveyor with a series of transverse slots in the portion thereof on which the bottles or other containers are to be supported as, among other advantages, such a construction enables the water being sprayed onto the containers to drain readily through the conveyor for rapid recirculation in the compartments 6, after heating. It is generally the practice also in such a conveyor to space the slots uniformly with respect to another along the length of the beams and to pattern the slots uniformly from one beam to the next so that in the assembled conveyor the slots align with one another longitudinally of the conveyor. A typical such slot arrangement is shown for carrier beams 18 of the present conveyor assembly 8 with the slots being indicated at 30 and shown as being located in the center or web portion 32 of the beams, the latter for purposes of representing a preferred embodiment of the invention depicted as having a partially closed or "pinched" channel cross-sectional configuration. The width as well as the spacing in the beams of the slots are largely matters of design preference and it will suffice to note that in the constructions with which the present applicant is most familiar the slot width typically is approximately seven-sixteenth of an inch and the slot spacing 1 ⅛ inches. In all events it is to be appreciated that the slot spacing and width is such as to afford the bottles or other containers which are to be handled on the conveyor a stabilized support on the carrier beams. A preferred construction has a slot arrangement wherein the bottles at all times subtend or cover at least two adjacent slots of the beams.

The above is primarily by way of setting forth a specific and presently preferred environment of the present invention and which as hereinbefore stated has as its general objectives and purposes the provision of an improved means for effecting the transference of the bottles relatively from the carrier beams of the conveyor to the discharge conveyor and which is specifically designed to effect such transfer movement without the bottles incurring bumping, jostling and the like and without the necessity of large numbers of bottles being present in and along the downstream end of the conveyor to effect bottle discharge from the machine. Generally, in the present invention this improved transfer action is attained by a receiver assembly denoted as a whole in the drawings by reference numeral 34 comprising a multiplicity of relatively elongated rodlike members or fingers mounted in side-by-side, laterally spaced relation to one another across the width of the housing in spanning relation between the downstream end of the conveyor assembly and the discharge conveyor. Alternating of the fingers are of a first construction, designated herein by reference numeral 36, and are arranged in the housing in positions of longitudinal alignment with the slotted portions 30 of the beams while the remaining fingers, those designated at 38, are of a second, slightly different or modified construction and are arranged midway or centrally between fingers 36 in positions of longitudinal alignment with the nonslotted or solid portions of the carrier beams.

Fingers 36 are designed to effect the initial removal of the bottles from the carrier beams through their inner tip or distal portions which as particularly noted in FIG. 4 extend to and lie in positions to effect registry with slots 30 of the carrier beams as the latter complete an operating pass in the housing. Preferably, the fingers 36 are angularly received in these slots so that a bottle in being engaged by the finger will tend to be lifted or stripped from the carrier beam as the latter progresses through the pass. In order to provide this angularity and yet at the same time maintain a relatively smooth path of travel for the bottles along the fingers and relatively from the latter to the discharge conveyor 16 in the preferred embodiment of the invention, the discharge conveyor is arranged in the end of the housing with its upper or operating pass, denoted at 40, at a slightly raised or elevated level as respects operating pass 10 of conveyor assembly 8 and fingers 36 are each bent intermediately of their ends so as to provide a rectilinear outer end segment 36A extending adjacent to and lying in planar relation with the discharge conveyor and an angularly downwardly extending inner end portion or segment 36B converging toward and terminating in the operating pass of the conveyor in the manner aforedescribed. For particularly advantageous operation, fingers 36 are provided an overall length which is well in excess of the actual "gap" or spacing between the end of the conveyor 8 and the discharge conveyor 16 and are angled toward the conveyor from a position or point on the fingers which is well toward the outer end thereof, a construction which permits of a relatively gradual approach of the fingers to the carrier beams whereby to afford the bottles a relatively gradual or gentle rise in moving off the beams and onto the fingers, In the particular construction shown herein, the horizontal portion 36A of the fingers is confined to the approximate outer one-fourth of the fingers, a distance approximating the actual gap or spacing between the inboard longitudinal edge of the discharge conveyor and the extreme downstream end of the main conveyor assembly, and thus the approximately inner three-fourths of the finger is included in the angled portion 36B, a relationship which in the illustrated construction results in the fingers 36 intersecting the operating pass of the conveyor a distance in from the end of the latter which is equal to from three to four times the width of a carrier beam. The angularity of the fingers to the beams in addition to providing a positive lifting or stripping of the bottles from the carrier beams is of further advantage in that it minimizes the risk of the fingers fouling on or interfering with the beams as the latter move through and interdigitate with the fingers by minimizing the extent to which the fingers are exposed to the beams in the horizontal plane of the operating pass. In this regard, it is desirable to provide the extreme inner tips of the fingers with an equal, but reverse bend to that between portions 36A and 36B so as to provide a short horizontal traverse of the fingers in the slots.

Before proceeding from the details of the fingers 36, it is to be observed that in the desired arrangement the inner or tip portions of the fingers in projecting into the slots of the carrier beams lie substantially coincident with or just below the webbed portion of the beams so that the bottles may move onto the fingers without disruption from the inner end or edges of the fingers. To provide this, it is of course necessary that the fingers be of a cross-sectional construction which will with the particular configuration afforded the slots of the beams provide necessary clearances, both lateral and vertical, with the slots when engaged therein.

Fingers 38 are designed to provide ancillary support to the bottles in and between the fingers 36 and to aid the fingers 36 in completing the stripping or lifting of the bottles from the beams. Fingers 38 are quite similar in construction to fingers 36, being formed with an outer, horizontal end portion 38A of the same length as the horizontal portion 36A of fingers 36 and which is disposed adjacent to and in a coincident plane with the discharge conveyor and with an angularly disposed, inner end portion 38B extending inwardly over and downwardly toward the end of the conveyor in substantially planar relation with the portions 36B of fingers 36. Fingers 38, however, are shorter in length than fingers 36 and in this instance terminate behind or in downstream relation to the inner ends of the fingers by a distance approximating the width of one of the beams and in positions just above or off the horizontal plane of conveyor operating pass 10 and directly above the webbed portions of the beams. Also in the case of the fingers 38, the inner ends are flattened or peened to form or define laterally enlarged, paddlelike end portions 42 designed to provide an expanded or increased area of support to the bottles along the inner ends of the fingers so as to facilitate the bottles attaining a stabilized position in moving onto the fingers from the carrier elements. These paddlelike portions 42 as particularly noted in FIG. 5 are in a coincident plane with one another and also are coincident with the corresponding faces or surfaces of the immediately adjacent portions of the fingers 36 so as to provide a smooth, substantially level support surface to the bottles continuously along the length of the fingers 36 and 38.

The fingers 36 and 38 as thus constructed and arranged provide a receiving means for the bottles which is substantially devoid of vertical discontinuities both in and over the length of the receiver and along the interface thereof with the conveyor. This enables, in turn, a relatively smooth passage of bottles from the carrier beams of the conveyor and a relatively smooth, unhindered subsequent transfer of the bottles to a final discharge conveyor.

With reference now to the particular means by which the fingers are mounted in the housing, it will be observed that laterally successive ones or series of the fingers 36 and 38 of the assembly 34 are grouped together for support purposes by a pair of tie rods 44 secured as by welding transversely along the underside of all the fingers of any given grouping with the tie rods located generally along the outer horizontal end portions of the fingers, and with one of the tie rods in each pair located well toward the outer ends of the fingers. In each such finger grouping, and it is to be understood that each of the fingers in the housing is a part of grouping, the particular fingers whether of the construction of a finger 36 or 38 along either lateral extreme or side of the grouping is modified along its outer extremity by the formation thereon of a downwardly turn hooklike portion or prong 46 which, as shown in the drawings, curls around the outermost of the tie rods 44 and extends tangentially therebelow a very slight distance, as for example, one-tenth of an inch. For support of the finger groupings in the pasteurizer, an angle bracket 48 is mounted transversely in the end of the housing as by a number of bolts means 50 some of which extend through suitable flanges 52 on either end of the bracket and through the housing sidewalls and others of which extend through the vertical wall 54 of the bracket and through an abutting sideplate 56 of discharge conveyor 16, the angle bracket in all cases being provided with vertically elongated receiving apertures for bolt means 50 to permit the brackets to be adjusted vertically in the housing. The upper horizontal wall or flange 58 of bracket 48 is provided with a series of enlarged vertical apertures 60 spaced laterally from one another by the spacing between the modified fingers of each of the finger groupings and located in predetermined positions along the bracket to align with either a slot of the carrier beams or with a nonslotted portion thereof depending upon the particular type of finger having this pronged end portion in each of the several finger groupings. The finger groupings are assembled onto the bracket by inserting the prong portions 46 of the side fingers of the groupings into corresponding ones of the enlarged, vertical bores 60 of the bracket to the extent permitted by the outer of the tie rods which because of their position to the prongs provide the main vertical support of the fingers on the bracket wall 58 with the engagement of the prongs in the openings 60 serving merely to anchor the fingers longitudinally in the housing. The only other restraint provided the fingers of the several groupings against movement in the housing and relatively of the bracket is derived from a series of pins 62 secured two per each of the separate finger groupings on the upper surface of bracket wall in positions to engage laterally against the pronged portions 46 of the modified fingers of each such grouping for the purpose of "squaring" up the fingers in the separate groupings thereof.

Thus supported by the bracket, the finger groupings are constrained only by the limited projection (generally about one-tenth of an inch as mentioned) of the prong 46 in the enlarged openings 60 in wall 58 against longitudinal movement in the housing and while this is sufficient to hold the fingers firmly in place for normal container receiving and transfer action, under an abnormal longitudinal load or force on the fingers of any particular finger grouping in moving through and under the fingers 36 and 38 in the course of transferring its complement of bottles thereto the prongs of the modified fingers of such finger grouping will tend to roll out of the bracket openings by the force reaction between the outer tie rod and the bracket wall 58. This frees the finger or fingers originally obstructing the carrier beam for movement in the pasteurizer from the bracket and in this way any accidental interference between the fingers and the beams is quickly overcome, generally before any structural damage can be incurred by either the carrier beams or the fingers. The finger grouping containing offending finger or fingers tends to be displaced or moved outwardly toward the discharge conveyor in popping free of its support bracket and to permit this movement without damaging interference of the fingers with the discharge conveyor, the outer ends of the fingers, other than those formed with the hooks, are tapered or bevelled in a direction inwardly toward the lower surface of the fingers from the upper surface thereof as shown at 56 in the drawings. With the present structure, a suitable control or trip mechanism is provided to effect an automatic stopping of the conveyor when a finger grouping is popped out of position by a carrier element to enable the finger grouping to be restored to a proper operating position in the housing and corrective action to be taken to prevent recurrence of the interference. In this manner the invention provides a means of preventing damage to the carrier elements of the conveyor and of avoiding as a consequence thereof time consuming repairs and/or replacement of damaged carrier elements.

This is a particularly desirable or advantageous feature of the invention as with the requirement of a close physical cooperation of the container receiving or transfer means with the carrier elements there is an obvious risk or likelihood of a carrier element from time to time engaging against or being interfered with in its movement by some portion or part of the receiving or transfer means due to such things, for example, as normal wear in the conveyor, manufacturing irregularities in the beams, particularly in the assembly inaccuracies in the conveyor or in the fingers, etc.

The operation of the container transfer means of the invention is believed to be fairly obvious in view of the detailed consideration above of its construction and, it will suffice to note that with the present arrangement, as successive of the carrier elements move into the discharge end of the housing the slotted portions of the beams will be initially engaged by the inner tips of the longer fingers 36. In the process of this movement such bottles as may be supported on the beams simultaneously pass over the finger tips while still in a fully supported, stabilized position on the carrier. As the carrier proceeds further downstream in the pass from a position in which the fingers initially enter the slotted portions of the beams, the leading edge of the bottles start to lift off the beam under the action of the fingers 36 and as the bottle proceeds further along the length of the fingers and while still engaging the carrier along its trailing edge it moves relatively over the inner ends of the fingers 38. As the beam continues in movement, the bottles leave the beam and move completely onto adjacent ones of the fingers 36 and 38 where it is stabilized by the fingers for further movement thereover to the discharge conveyor. The bottles once transferred onto the inner ends of the fingers are then pushed along the fingers by the pressure or force of ensuing bottles being delivered at the fingers by succeeding of the carrier elements, the bottles eventually being pushed up onto and outwardly across the horizontal outer end portions of the fingers for receipt on and removal from the machine by the discharge conveyor. This movement of the bottles onto the finger elements from the carrier beams is accomplished in an extremely smooth manner and as a result bottle transfer can be and normally is effected by a relatively low back pressure or force on the bottles. This is of advantage in that it eliminates the need for large numbers of bottles in the discharge end of the machine in front of the fingers to insure a continuous movement of bottles onto and over the fingers and avoids large numbers of bottles remaining backed-up in front of the transfer means at the end of an operating shift of the machine or upon terminating the run of a given type of container in the machine.

While described in conjunction with the stripping and discharge of bottles from a slotted carrier beam type conveyor, the novel stripping means of the invention has further utility in the transfer of bottles and the like onto such a conveyor. Thus, in the case of the pasteurizer which has been described herein, a similar such arrangement of fingers may be incorporated into the feed or load end of the mechanism in a position between the infeed conveyor, which like the discharge conveyor operates transversely of the machine, and the carrier beam type conveyor at the point where the beams commence movement in the operating run. In this instance, the fingers would be extended inwardly to and over the carrier beams in a downwardly angled fashion but would otherwise be identically constructed and have the same arrangement and operation as previously set forth. This use of the stripper fingers is not shown in any detail herein as it is believed fairly obvious as to the manner in which such use could be effected. It is well to point out, however, that a principal feature of the present stripper means is the elimination from the path of travel of containers such as bottles of sharp abutment edges or surfaces over which the bottles are required to be moved in being transferred from one conveyor to another and which edge or surface tends to block container movement or requires the development of a heavy back pressure or force on the bottle to cause passage over such edge or surface. This problem is not present in the loading of bottles onto the carrier-type conveyor in the same degree of acuteness as in the infeed end of the pasteurizer nor indeed is the problem of the carriers snagging on the dead plate or contacting the latter and incurring extensive damage present in the load end of the mechanism with the same degree of acuteness as in the case of the discharge end of the latter.

Various modes of carrying out the present invention are contemplated as being within the scope of the following claims particularly pointing out and distinctly claiming the subject matter regarded as the nature of the invention.

I claim:

1. Means for receiving upright containers from a conveyor of the type which is formed of a continuous succession of transversely extending regularly slotted carrier beams and which includes a horizontal operating pass and a lower paralleling return pass, comprising a multiplicity of elongate, parallel extending fingerlike elements arranged longitudinally of the conveyor along the downstream end thereof as regards the direction of container movement, certain of the elements longer than the others and having free inner end portions extending inwardly over and angularly downwardly towards the conveyor in the operating pass thereof and terminating in the plane of such pass in positions to engage within the slotted portions of the successive carrier beams as the latter complete an operating pass whereby to effect an initial lifting of such containers as are on the beams from the latter, and with other and shorter of the elements having free inner end portions extending inwardly over and angularly downwardly towards the conveyor in the operating pass thereof in a coincident plane with that of the inner free end portions of the first-mentioned fingers and terminating in a plane just above the operating pass of the conveyor and in positions which are downstream of the ends of the first-mentioned fingers whereby to cooperate with the latter in effecting final lifting of the containers from the beams.

2. The construction of claim 1 in which each of the first-mentioned fingerlike elements is located between a pair of the second-mentioned fingerlike elements.

3. The construction of claim 1 in which the terminals of the inner free end portions of the second mentioned fingerlike elements are enlarged laterally to the longitudinal axis thereof whereby to afford added support to the containers as the latter lift off the beams and move onto the fingerlike elements.

4. The construction of claim 1 wherein the fingerlike elements are spaced uniformly with respect to one another laterally of the conveyor to form an assembly whose lateral dimension is substantially equal that of the conveyor and wherein the first and second-mentioned elements are alternated with one another in such assembly.

5. Means for effecting the removal of upright containers from a horizontally extending conveyor which is formed of a continuous succession of regularly slotted, transversely extending carrier beams, comprising a series of elongated, angular fingerlike elements arranged in parallelism, planar relation with one another longitudinally of the downstream end of the conveyor as regards the direction of container movement, with a first series of the elements being aligned with the slotted portions of the carrier beams and having free inner end portions extending over and angularly downwardly toward the end of the conveyor and terminating in the plane of the conveyor in positions to engage within the slotted portions of the beams in the end of the conveyor so as to engage under and effect a stripping of such containers as are supported on any particular carrier beam as the later moves through the end of the conveyor, and with a second series of the elements being aligned with the nonslotted portions of the carrier beams and having free inner end portions extending over and angularly downwardly the end of the conveyor in planar relation to the inner end portions of the first series of elements and terminating downstream of the inner end portions just above the plane of the conveyor so as to engage under and complete the stripping from the carrier beams of the containers after the latter have commenced to move off the beams by the action of the first series of elements.

6. The construction of claim 5 wherein the inner free end portions of the first series of fingerlike elements in engaging within the slotted portions of the carrier beams extend to a plane which is substantially coincident with the plane containing the nonslotted portions of the beams so as to enable the containers to pass from the beams onto the first series of elements without interference from the inner extremities of such elements and wherein the inner free end portions of the second series of fingerlike elements extend to a plane which is substantially coincident with the plane containing the corresponding portions of the first series of fingerlike elements to permit the containers to pass onto the second series of fingerlike elements from the first series thereof without interference from the inner extremities of the second series of fingerlike elements.

7. The construction of claim 5 in which groups of adjacent of the fingerlike elements are connected together as an assembly by tie rods extending transversely of the elements and wherein the assemblies have a vertically bored support bracket associated therewith and include at least a pair of elements the outer end of which has a downwardly turned hooklike portion having a limited projection within a corresponding one of the vertically bored portions of said support bracket to locate the elements longitudinally of the conveyor, the fingerlike elements being otherwise free of constraint against longitudinal movement from the conveyor and the projection of the hooklike portions in the bracket openings being such as to free any such assembly of fingerlike elements from said support bracket in the event of interference between a carrier beam and any one or more of the fingerlike elements of such assembly.